United States Patent [19]
Hollis

[11] 3,742,383
[45] June 26, 1973

[54] PULSING SYSTEM

[75] Inventor: Ernest E. Hollis, Bedford, Mass.

[73] Assignee: Sanders Associates, Inc., Nashua, N.H.

[22] Filed: July 12, 1971

[21] Appl. No.: 161,754

[52] U.S. Cl. .......... 331/111, 331/117 R, 307/268, 307/283, 307/302
[51] Int. Cl. .......... H03k 3/335
[58] Field of Search .......... 307/202, 246, 263, 307/268, 270, 283, 302, 317, 319; 328/66, 113; 331/107 R, 117 R, 128, 131

[56] References Cited

UNITED STATES PATENTS

| | | | |
|---|---|---|---|
| 1,792,781 | 2/1931 | Thilo | 331/107 X |
| 3,147,408 | 9/1964 | Yamamoto et al. | 331/117 R |
| 3,235,817 | 2/1966 | Stapelfeldt | 331/117 X |
| 3,544,818 | 12/1970 | Harris | 307/265 X |
| 3,104,329 | 9/1963 | Haas, Jr. | 307/265 |
| 3,375,378 | 3/1968 | Vandemore et al. | 307/246 X |
| 3,114,056 | 12/1963 | Berge | 307/302 X |
| 3,374,422 | 3/1968 | Blume | 307/246 X |
| 3,308,308 | 3/1967 | Bray | 307/302 X |
| 3,571,614 | 3/1971 | Rolstead | 307/253 X |
| 3,151,251 | 9/1964 | Lee | 307/246 X |
| 3,428,863 | 2/1969 | Wright | 307/246 X |
| 3,539,832 | 11/1970 | Jones, Jr. et al. | 307/270 X |
| 3,411,045 | 11/1968 | Reyner | 307/270 X |

*Primary Examiner*—John Zazworsky
*Attorney*—Louis Etlinger

[57] ABSTRACT

A pulsing system is described in which a capacitor is charged until it reaches the avalanche breakdown voltage of a transistor whereupon it discharges through the transistor and the load. Included in series with the load is the parallel combination of a small inductance and a diode poled to be conductive in the direction of capacitor discharge. During capacitor discharge, the diode short circuits the inductance so as to permit a fast rise time. When the capacitor has discharged and the transistor has again become non-conductive, the reverse voltages caused by the stray reactances appear principally across the small inductance instead of across the load thereby preventing overshoot.

3 Claims, 1 Drawing Figure

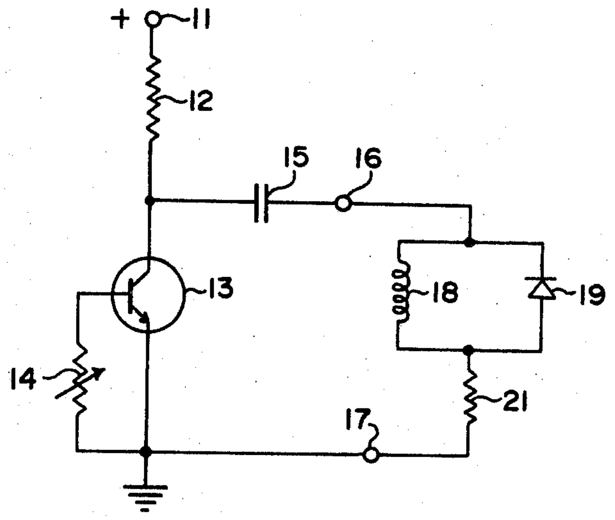
ERNEST E. HOLLIS
INVENTOR.
BY W. L. [signature]
ATTORNEY

PULSING SYSTEM

FIELD OF THE INVENTION

This invention relates generally to pulsing systems and particularly to pulsing systems exhibiting very fast rise and fall times, very short durations, and little or no overshoot.

BACKGROUND

There is now a requirement for pulsing systems capable of supplying large currents yet exhibiting very fast rise and fall times. For example, a typical laser diode should be supplied with a current pulse having an amplitude of many amperes yet exhibiting rise and fall times of not more than a few nanoseconds. When attempts are made to meet these requirements with the pulsing systems of the prior art, it is found that almost invariably there is an intolerable amount of overshoot, that is, reverse voltage at the end of the pulse, which destroys the laser diode.

OBJECTS OF THE INVENTION

It is the general object of the present invention to provide an improved pulsing system.

Another object of the invention is to provide a pulsing system capable of supplying large currents yet at the same time exhibiting very small rise and fall times and very little overshoot.

SUMMARY OF THE INVENTION

Briefly stated, a pulsing system incorporating the invention includes a small inductance connected in series with the load and shunted by a diode poled to pass current in the forward direction during pulses so that passage of the pulse current is virtually uninhibited. However, the reverse voltages arising at the end of the pulse because of stray reactances appear principally across the small inductance instead of across the load thereby minimizing overshoot.

DESCRIPTION OF PREFERRED EMBODIMENT

For a clearer understanding of the invention reference may be made to the following detailed description and the accompanying drawing, the single FIGURE of which is a schematic diagram of a preferred form of the invention.

Referring now to the drawing there is shown a source of positive potential indicated schematically by the terminal 11 which is connected to one terminal of a resistor 12 the other terminal of which is connected to the collector of an NPN transistor 13 the emitter of which is grounded. The base of the transistor 13 is connected through an adjustable resistor 14 to ground. The junction of the resistor 12 and the collector of the transistor 13 is connected to one plate of capacitor 15 the other plate of which is connected to a terminal 16. The portion of the apparatus so far described, along with the common or ground terminal 17, constitutes a pulse generator. More specifically, it is a pulse generator of the relaxation oscillator variety, the operation of which will be fully explained. The terminal 16 is connected to the parallel combination of a small inductance 18 and a diode 19 which is poled so that its cathode and one terminal of the inductance 18 are connected to the terminal 16. The anode of the diode 19 and the other terminal of the inductance 18 are connected together and to one terminal of the load device, indicated schematically by a resistor 21, the other terminal of which is connected to the common terminal 17.

It is helpful to first consider the operation of the device assuming that the inductance 18 and the diode 19 were omitted, that is, that there were a direct connection from the capacitor 15 to the load resistor 21. Then, when the voltage source 11 is first applied, the capacitor 15 charges through the resistor 12 and the load 21 until it reaches the avalanche breakdown voltage of the transistor 13 whereupon it discharges suddenly through the transistor 13 and the load 21. It is to be noted that there is very little reactance in the circuit outside of the capacitor 15 and outside of the inherent stray reactances. Additionally, the resistance is low so that a very large current with a very fast rise time is passed through the load device 21. When the capacitor 15 has substantially discharged, the transistor 13 again becomes nonconductive thereby interrupting the discharge path. The stray reactances although small, are not insignificant because of the very large current and the fast turn off of the transistor 13. It has been found that these stray reactances cause the circuit to "ring" with the result that a large inverse voltage is developed across the load device 21. If this device were a laser diode, such a large inverse voltage would be intolerable because it would destroy the device.

Considering now the situation with the inductance 18 and the diode 19 in the circuit, the action is quite similar at the beginning of the pulse. The capacitor discharges as before and the diode 19, which is preferably a "fast turn-on" diode, almost completely shorts out the inductance 18 at this time and allows the current to build up very quickly. However, the resistance of the diode is not zero and a small current does flow through the inductance 18, generating a field and storing energy. When the capacitor 15 has substantially discharged and the transistor 13 has again become nonconductive, the energy stored in the stray reactances tends to cause the ringing phenomenon noted above. However, because the current is undergoing an extremely fast change, the voltage induced in the inductance 18 is large and is of such polarity as to oppose the build up of a reverse voltage across the load 21. It is to be noted that this induced voltage back biases the diode 19 at this time so that the diode is effectively out of the circuit.

A specific embodiment of the invention was constructed to supply pulses to a laser diode and was tested using a dummy load comprising many small valued resistors connected in parallel. The parameters of the circuit were as follows:

| | |
|---|---|
| Transistor **13** | T.I. type 2 N 3033 |
| Resistor **12** | 39, 000 ohms |
| Resistor **14** | 20, 000 ohms |
| Capacitor **15** | 1, 000 pico farads |
| Inductance **18** | 10 microhenries |
| Diode **19** | Fairchild FD 100 |
| Load **21** | Less than 1/2 ohm |
| Voltage source | 122 volts positive |

This circuit was tested and found to deliver pulses having a peak amplitude of about 30 amperes to the load at a voltage of about 15 volts across the load, having a rise time of less than two nanoseconds, a fall time of less than 3 nanoseconds, and a total pulse width of about 10 nano-seconds. The overshoot, that is, the reverse voltage appearing across the load at the end of the pulse, was found to be less than two volts. Another circuit, identical except that the inductance 18 and diode 19 were replaced by a conductor, was constructed and tested. This circuit was found to produce a reverse voltage across the load of approximately 8 volts which is much in excess of that required to destroy many laser diodes.

From the foregoing it will be apparent that applicant has provided an improved pulse generator capable of supplying high current pulses to a low impedance load with fast rise and fall times and very little overshoot.

Although a particular embodiment of the invention has been described in detail for illustrative purposes, many modifications will occur to those skilled in the art. It is therefore desired that the protection afforded by Letters Patent be limited only by the true scope of the appended claims.

What is claimed is:

1. A pulsing system, comprising,
a capacitor,
a charging circuit for said capacitor, said circuit including a series connection of
a unidirectional voltage source
a resistor,
said capacitor,
an inductance, and
a load
a discharge circuit for said capacitor including a series connection of
said capacitor,
the collector-emitter circuit of a transistor
said load, and
a diode shunting said inductance.

2. A pulsing system in accordance with claim 1 further including means for biasing said transistor to be nonconductive for collector-emitter voltages less than the avalanche breakdown voltage of said transistor.

3. A pulsing system comprising
a first series circuit including a capacitor, an inductance and a load,
a second series circuit including a source of unidirectional voltage and a resistor,
said first and second circuits being connected in parallel,
whereby said capacitor may be charged by said source,
a transistor including a base, a collector and an emitter,
means for biasing said base and said emitter to substantially the same potential,
the collector-emitter circuit of said transistor being connected in parallel with said first and second series circuits with such polarity that the collector-base junction of said transistor is reverse biased by said source,
whereby when the charge on said capacitor exceeds the avalanche breakdown voltage of said transistor, said capacitor discharges through said transistor and said first series circuit, and
a diode shunting said inductance and poled to pass current in the forward direction during discharge of said capacitor.

* * * * *